United States Patent [19]
Zieve

[11] Patent Number: 5,033,174
[45] Date of Patent: Jul. 23, 1991

[54] YOKE ASSEMBLY SYSTEM FOR LARGE SCALE MECHANICAL ASSEMBLY OPERATIONS

[76] Inventor: Peter B. Zieve, 5766 27th Ave. NE., Seattle, Wash. 98105

[21] Appl. No.: 484,350

[22] Filed: Feb. 22, 1990

[51] Int. Cl.$^5$ .................. B23Q 1/02; B23C 1/04; B23B 39/16
[52] U.S. Cl. .................. 29/34 B; 29/33 K; 408/42; 409/212
[58] Field of Search .......... 29/34 B, 34 R, 26 A, 29/33 K, 419.2, 33 R, 26 R; 409/219, 212, 235; 408/37, 38, 39, 40, 42, 12, 70

[56] References Cited

U.S. PATENT DOCUMENTS

| | | | |
|---|---|---|---|
| 3,094,015 | 6/1963 | Mead | 408/39 |
| 3,704,506 | 12/1972 | Orr et al. | 29/419.2 |
| 3,867,053 | 2/1975 | Lecailtel | 408/70 X |
| 3,973,859 | 8/1976 | Huber et al. | 408/12 |
| 4,637,761 | 1/1987 | Murray et al. | 29/26 A |
| 4,658,485 | 4/1987 | Yang | 29/26 A |
| 4,864,702 | 9/1989 | Speller et al. | 29/34 B |
| 4,885,836 | 12/1989 | Bonomi et al. | 29/34 B |

FOREIGN PATENT DOCUMENTS 2901005 7/1980 Fed. Rep. of Germany ........ 403/38

Primary Examiner—William Briggs
Attorney, Agent, or Firm—Jensen & Puntigam

[57] ABSTRACT

A C-shaped yoke (42) extends over the top of a fixture (10) containing a part to be assembled. A first support frame (70) is supported on the fixture (10) and moves longitudinally therealong. A second support frame (94) is secured to the yoke (42) and is mounted on the first support frame (70) for vertical movement relative thereto. One linear actuator (128) connects one portion (122) of the second support frame (94) to the remainder thereof so as to provide a capability of yaw movement for the yoke (42), while another linear actuator (200) connects the second support frame (94) with the yoke (42) in such a manner as to provide a capability of roll movement for the yoke (42). A pair of actuator systems (54,56) are mounted on the lower ends of the yoke (42) for movement toward and away from each other. The actuator systems (54,56) contain the automated tools such as drill, riveting assemblies, etc., for performing the desired mechanical operations.

22 Claims, 6 Drawing Sheets

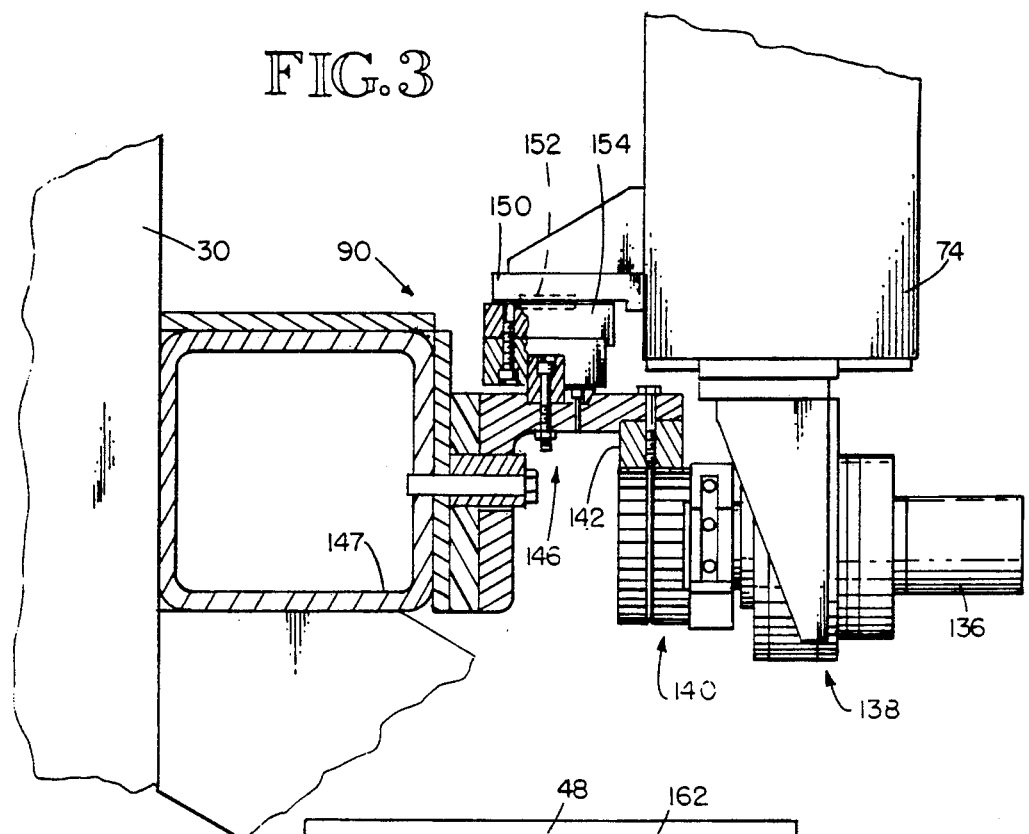

YOKE ASSEMBLY SYSTEM FOR LARGE SCALE MECHANICAL ASSEMBLY OPERATIONS

DESCRIPTION

1. Technical Field

This invention relates generally to apparatus for performing large-scale mechanical operations such as drilling, riveting, etc. on parts which are typically held in a fixture for assembly and, more specifically, concerns such an apparatus capable of moving relative to the supporting fixture along more than one axis.

2. Background Art

Automated mechanical assembly operations such as riveting, etc. required in the manufacture of aircraft wing spars and the like have typically required very large and complex machines. The art is dominated by hydraulic "C" yoke squeezer machines which are so large and massive that the part being assembled must be positioned horizontally into the laterally opening yoke at substantial distances, i.e. 10 feet and more, from the ground. Since many assembly operations on such parts are performed while the part is initially mounted in vertically oriented fixtures, such parts must be taken out of such vertical fixtures, after temporary fastening is accomplished, and then positioned horizontally on a table or other support system to permit the desired assembly operations to be performed by the hydraulic squeezer machines. Such machines, because of their bulk and weight, cannot be used on parts held in a fixture, particularly vertical fixtures (which is the only practical arrangement, permitting convenient access to both sides of the part) since the yoke structure on such machines cannot practically be positioned over the top of a vertical fixture. The existing hydraulic squeezer machines thus have the disadvantage of contributing to the inefficiency of the overall assembly process, in addition to the inherent disadvantages of expense and weight of the machine itself.

Also, in many automated assembly machines, particularly those having a capability of performing riveting operations, opposed actuators must be used on opposite sides of the part being assembled, and it is often difficult to precisely align and control the opposing actuators as required to produce the desired results.

In addition, existing automated assembly machines typically include a complicated support structure and/or control system for operating on curved portions of the part being assembled. The existing automated machines are a significant advance in many cases over hand assembly operations, but frequently, they are relatively slow in operation, and are often difficult to maintain and repair.

DISCLOSURE OF THE INVENTION

Accordingly, the present invention is a movable yoke assembly for performing mechanical operations on a large scale part such as an airplane spar which is supported by a fixture or the like. The yoke assembly, which is movable relative to the fixture, includes a generally "C"-shaped continuous yoke which extends over the top of the fixture and down along at least a substantial portion of the opposing sides thereof. The yoke is supported relative to the fixture and means are provided for moving the yoke longitudinally along the fixture and for moving the yoke laterally, i.e. vertically, relative to the fixture. A pair of actuator systems containing the mechanical equipment, such as drills and riveters, are mounted on opposing leg portions of the yoke, in opposed alignment with each other. Means are provided for moving the respective actuator systems directly toward and away from each other.

BRIEF DESCRIPTION OF THE DRAWINGS

FIG. 3 shows in detail the apparatus for moving the yoke assembly longitudinally along the fixture.

FIG. 4 shows a side elevational view of the yoke assembly of FIG. 1.

BEST MODE FOR CARRYING OUT THE INVENTION

Figure 1:
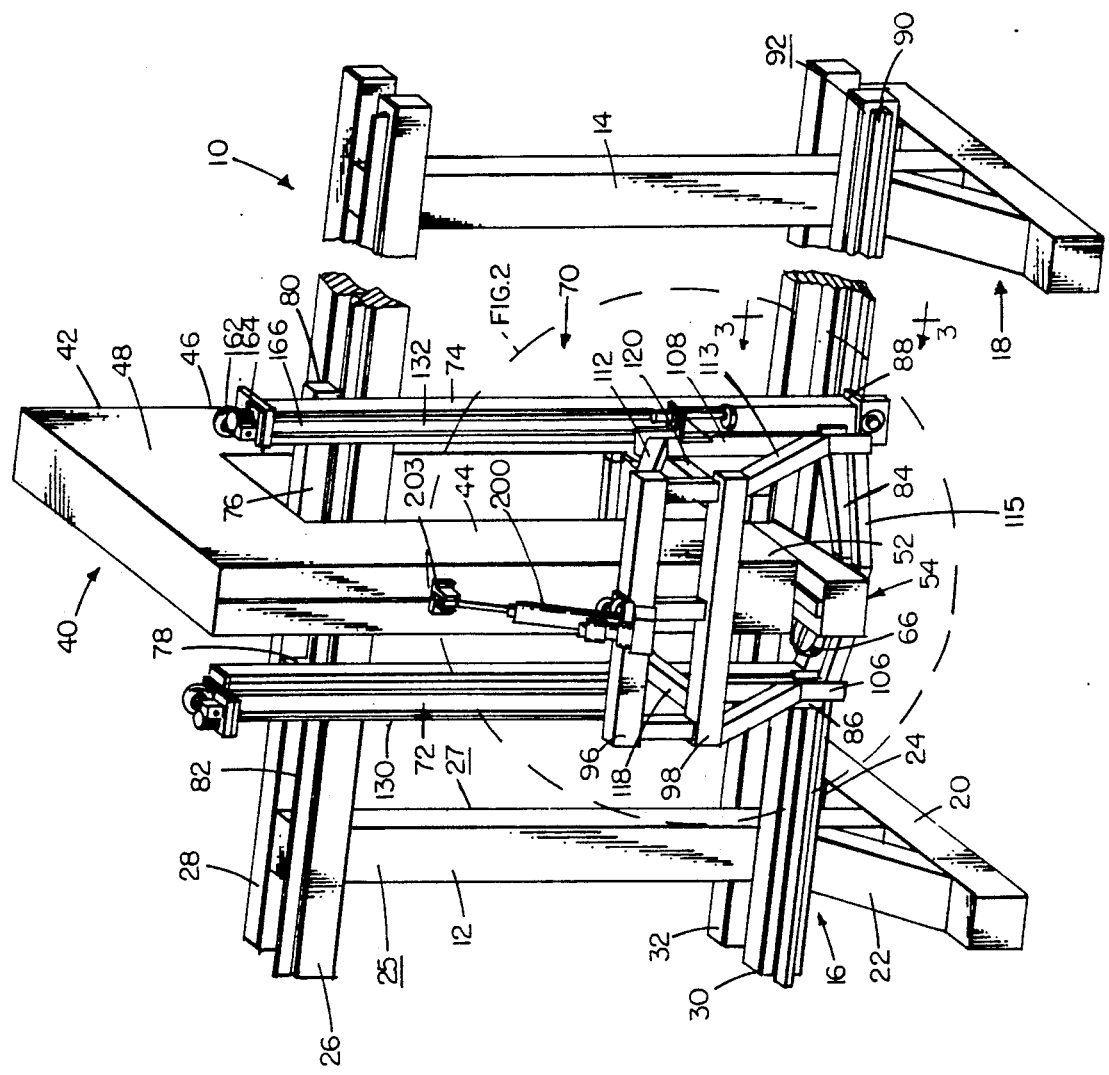
FIG. 1 is an isometric view showing the yoke assembly of the present invention in position about a representative fixture capable of holding a part to be assembled.
Figure 2:
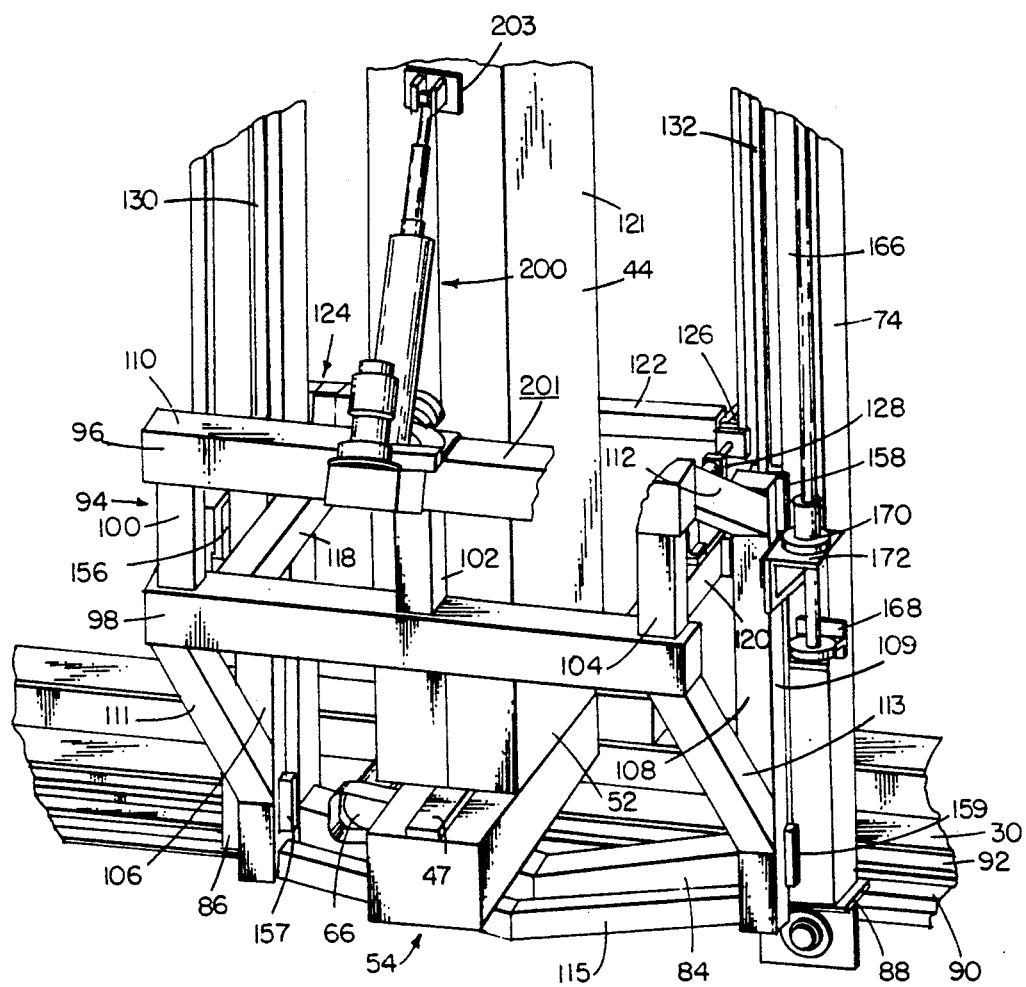
FIG. 2 shows a portion of the yoke assembly of FIG. 1.

FIGS. 1, 2, and 4 show one embodiment of the yoke assembly of the present invention and its structural relationship to a fixture which in turn supports a part being assembled. The fixture for supporting the part to be assembled is shown generally at 10. For purposes of explanation, the fixture 10 described herein is for the support and assembly of a large aircraft part, such as a wing spar. However, it should be understood that the fixture 10 may be of various sizes and configurations, to accommodate a particular part being assembled. The fixture 10 shown in FIGS. 1, 2, and 4 includes two upright support members 12 and 14, each supported by base assemblies 16 and 18, respectively. The base assemblies (assembly 16 is exemplary) includes a horizontal support element 20 and two angled support brackets 22 and 24 which connect the horizontal support element 20 to the upright support member 12.

Extending between the upright support members 12 and 14 at the respective upper ends thereof are upper longitudinal beam members 26 and 28, which are secured to the front and rear surfaces 25 and 27, respectively, of upright support members 12 and 14. Similarly, lower longitudinal beam members 30 and 32 connect upright support members 12 and 14 near the lower ends thereof, slightly above the respective base assemblies 16 and 18. The fixture 10 is thus stable and sufficiently strong to support the part being assembled. It should be noted that FIG. 1 shows a fixture of a certain length. The fixture may be made in different lengths and different heights in order to accommodate a particular part. The fixture is made of steel or other strong metal, in the form of elongated square tubes. A typical dimension of upright support members 12 and 14 is 12 inches square. The other parts of fixture 10 are dimensioned accordingly.

The yoke assembly of the present invention is shown generally at 40 and includes a continuous "C"-shaped yoke 42. The C-shaped yoke 42 extends over the top of the fixture 10 and down the respective opposing sides of the fixture, as shown most clearly in FIGS. 1 and 4. The yoke 42 includes two opposing leg sections 44, 46 which are positioned vertically, connected by a horizontal intermediate section 48, when the yoke 42 is oriented vertically as shown in FIG. 1. The intermediate section 48 is typically long enough to provide reasonable lateral clearance of the fixture 10 for the two leg sections 44 and 46. The leg sections 44,46 are typically sufficiently long to extend down to the vicinity of the lower longitudinal beam members 30 and 32 when the intermediate section 46 of yoke 42 is in proximity to the upper longitudinal beam members 26 and 28. Typically, the leg sections 44,46 must be long enough that in the lowermost position of the yoke 42, the lower free ends 50 and 52 of the leg sections 44 and 46 will be at approximately the same level as the lower edge of the part being assembled, while in the uppermost raised position of the yoke 42, the lower ends 50 and 52 of the leg sections 44 and 46 will be at approximately the same level as the upper edge of the part being assembled. Such an arrangement provides the apparatus of the present invention the required access to all portions of the part to be assembled.

In the embodiment shown, the yoke 42 is a strong, stable unit, made of steel, aluminum or other high strength material. The yoke 42 in cross section is approximately 15 inches by 31 inches, rectangular and in the embodiment shown is made from sheets of aluminum welded together. In another embodiment, the yoke 42 may comprise composite materials. In the embodiment shown, with the fixture 10 having a total height of 12 feet and the distance between the upper and lower longitudinal beam members being approximately 8 feet, the yoke 42 is approximately 11 feet high by 10 feet wide (FIG. 4) from front to back. This yoke structure is adequate for low reaction force operations.

Attached to the lower ends 50 and 52 of each leg section 44 and 46 of the yoke 42 are actuator systems 54 and 56. Actuator systems 54 and 56 generally include support tables 58 and 60 which are movably connected to the lower ends 50 and 52 of leg sections 44 and 46 of yoke 42. The support tables 58 and 60 support the mechanical tools and accompanying equipment to perform the desired mechanical operations. In one example, on support table 60 is a riveting apparatus 63 while on actuator table 58 is a matching riveting apparatus 64, as well as a drill 66 with its accompanying motor and a milling head (not shown) for removing the top of the rivet after riveting operations have been completed. The riveters can be any one of a number of different units, but, in one example, they could be low voltage, low reaction force riveting machines such as disclosed in U.S. Pat. No. 4,862,043.

It should be understood that the mechanical devices described herein are by example only and that other mechanical operations could be performed with the yoke assembly of the present invention using other equipment.

The actuator systems 54 and 56 are in opposed alignment with each other, mounted on yoke 42 so as to always directly oppose each other, regardless of the position of the yoke 42. This arrangement has significant operational advantages for the structure as a whole, as will be more fully explained hereinafter.

The support structure for the yoke 42 relative to the fixture 10 is shown in FIGS. 1, 2, and 4 with a portion thereof shown with particularity in FIG. 3. The support structure includes a first frame referred to generally at 70. First frame 70 includes a pair of vertical supports 72 and 74 which extend between the upper and lower longitudinal beam members 26 and 30 of the fixture 10.

Connecting the vertical supports 72 and 74 near the upper ends thereof is an upper connecting member 76. In the embodiment shown, upper connecting member 76 is secured to vertical supports 72 and 74 by means of connecting brackets 78 and 80. Upper connecting member 76 is configured so as to ride either about or immediately adjacent to a guide member 82 which is in the form of an upright bracket secured to the top of upper longitudinal beam member 26. This arrangement provides stability between vertical supports 72 and 74 and helps to assure that first frame 70 moves in a stable fashion longitudinally along the fixture 10.

At the lower ends of vertical supports 72 and 74 is a lower connecting member 84. Lower connecting member 84 comprises two portions which extend toward each other from vertical supports 72 and 74 at a slight downward angle until they meet at a point approximately halfway between vertical supports 72 and 74. Hence, lower connecting member 84 is in the embodiment shown in the form of a very shallow "V".

In the embodiment shown, vertical supports 72 and 74 are square steel tubes, approximately 8 inches on a side while upper and lower connecting members 76 and 84 also comprise square steel tubes approximately 6 inches on a side. The lower ends 86 and 88 of support members 72 and 74 are slidably supported on a horizontal slide assembly 90 which is positioned on the front surface 92 of lower beam member 30 of fixture 10. The slide assembly 90 and the apparatus for moving the first frame 70 longitudinally therealong is explained in more detail hereinafter.

A second support frame is referred to generally at 94. The second support frame 94 is connected directly to yoke 42 and is slidably connected to the first frame 70, thereby providing the required structural connection between yoke 42 and the first support frame 70. The second support frame 94, like the first support frame 70, comprises a number of elongated, square tubular elements connected together in a particular arrangement. Specifically, the second support frame 94 includes two longitudinal primary horizontal members 96 and 98. Primary horizontal members 96 and 98 are each approximately 5 feet long and are square steel tubes approximately 6 inches on a side. Primary horizontal members 96 and 98 are spaced apart approximately 12 inches and are supported relative to each other by vertical intermediate support elements 100, 102, and 104.

The second support frame 94 also includes two primary vertical members 106 and 108. Primary vertical members 106 and 108 are each approximately 4½ feet long and are made of tubular steel approximately 6 inches on a side. Connecting primary horizontal members 96 and 98 to primary vertical members 106 and 108 are lateral intermediate support elements 110 through 113. The respective ends of primary horizontal member 96 are connected, respectively, by lateral intermediate support elements 110 and 112 to the upper ends, respectively, of primary vertical members 106 and 108, while the respective ends of primary horizontal member 98 are connected by lateral intermediate support elements 111 and 113 to primary vertical members 106 and 108 in the vicinity of the lower ends thereof. Lateral intermediate support elements 110 through 113 are also tubular and square in cross section, approximately 4 inches on a side.

A lower longitudinal intermediate support element 115 extends between the lower ends of primary vertical members 106 and 108. Longitudinal intermediate support element 115 comprises two portions which extend toward each other at a slight downward angle, meeting at a point approximately halfway between primary vertical members 106 and 108, such that longitudinal intermediate support element 115 forms a very shallow "V" between primary vertical members 106 and 108. Longitudinal intermediate support element 115 is also tubular, square in cross section, and approximately 4 inches on a side.

Extending rearwardly from the rear surface of primary horizontal member 98 near the two ends thereof are two horizontal laterally extending tubular frame members 118 and 120. A horizontal longitudinally-extending tubular frame member 122 is directly secured to the back surface 121 of leg section 44 of yoke 42. The ends of longitudinally extending frame member 122 are connected, respectively, to the rearward ends of laterally extending frame members 118 and 120, as shown in FIG. 2 and in more detail in FIG. 5, by means of a spherical bearing 124 on one end of longitudinally extending frame member 122 and a spherical bearing 126 and actuator/slide assembly 128 at the other end thereof. This arrangement will be explained in more detail in following paragraphs in connection with FIG. 5.

The primary vertical members 106 and 108 of second support frame 94 are supported relative to vertical supports 72 and 74 of first frame 70 by means of elongated slides 130 and 132 secured to the respective front surfaces of vertical supports 72 and 74. This arrangement provides for vertical movement of the second support frame 94, and hence yoke 42, relative to the first support frame 70 and fixture 10. The specific structural arrangement will be explained in more detail hereinafter.

FIG. 3 shows in detail the structure for moving the first support frame 70 and hence, the second support frame 94 and the yoke 42 as well, longitudinally along fixture 10. The lower portion of vertical support 74 is shown, as is the horizontal slide assembly 90 positioned on the front surface of lower longitudinal beam member 30 of fixture 10. A motor 136 drives a gear reducer 138, which in turn drives a pinion gear 140. The pinion gear 140 mates with, and moves along, a longitudinal gear rack 142 which is secured by a bolt or similar device to a mounting bracket assembly shown generally at 146 which is secured by a bolt or device to a support tube 147 which is connected to the lower longitudinal beam member 30.

For stability, vertical support 74 is connected through a horizontal arm 150 and a spherical washer 152 to a linear way element 154 which secured in turn to the mounting bracket assembly 146. This arrangement allows for a slight misalignment between the vertical support elements 72 and 74 and the lower horizontal beam element 30.

In operation, actuation of motor 136 will drive the entire first frame 70, and hence second frame 94 and yoke 42, longitudinally along fixture 10. This is the longitudinal axis movement or first reference direction for yoke 42.

Although the above-described embodiment shows the first frame 70 supported on the fixture 10 itself, for movement therealong, it should be understood that first frame 70 could be supported on an entirely separate guide element positioned adjacent the fixture 10 or along a track in the floor adjacent the fixture 10.

FIG. 1 shows the means for moving the second frame 94 vertically relative to the first frame 70. This provides movement of yoke 42 in a second reference direction, along a vertical axis relative to the fixture 10. As mentioned above, slides 130 and 132 are positioned, respectively, on the front surfaces of vertical supports 72 and 74. Mating with the slides 130 and 132 are slidable support pads 156 through 159 positioned on the rear surfaces of the primary vertical frame members 106 and 108 of second support frame 94, in the vicinity of the upper and lower ends thereof, respectively.

Positioned on the top of each vertical support 72 and 74 (74 is exemplary) is a motor 162 and related gearing 164 which drives an elongated linear ball screw 166, which extends down the front of vertical support 74 to within approximately 2 feet of the lower end thereof. Referring to FIG. 2, the lower end of linear ball screw 166 is supported on a bracket 168 which extends outwardly from vertical support 74. Linear ball screw 166 extends through a mating ball nut 170 which is positioned on a bracket 172 which, in turn, is secured to a side surface 109 of primary vertical member 108 of second support frame 94.

In operation, motor 162 will drive, i.e. rotate, linear ball screw 166, which will result in the second support frame 94 moving vertically, depending upon the direction of rotation of the ball screw. Since the second support frame 94 is secured to the yoke 42, as described above, the yoke will move vertically with the frame 94, along the vertical in a second reference direction.

As indicated above, the respective actuator systems 54 and 56 are movably supported on the lower ends of leg sections 44 and 46 of yoke 42. In the embodiment shown, actuator systems 54 and 56 directly oppose each other and are in continuous alignment with each other, mounted for movement in only one direction i.e. toward and away from each other along slides 47 and 49, respectively. Conventional motors control the movement of the actuator systems toward and away from each other under the control of a computer. The computer will also control the sequence of mechanical operations, i.e. drilling, riveting (including clamp-up and other required actions) and milling of the upset rivet head.

Figure 5:
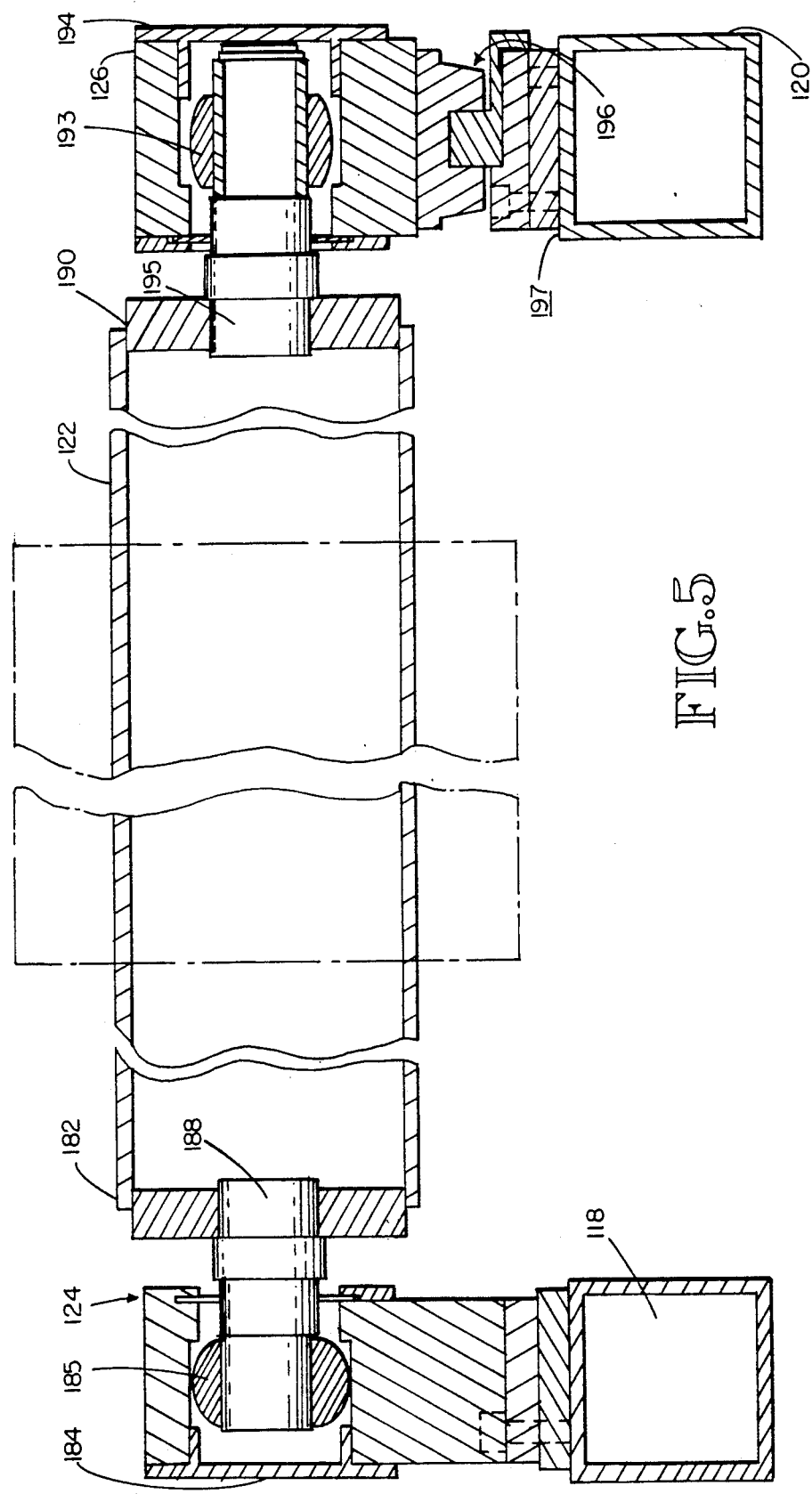
FIG. 5 shows the details of the structure for producing yaw and roll movement for the yoke assembly of the present invention.

FIG. 5 shows in more detail the structural arrangement of that portion of the second support frame 94 which connects the second support frame 94 to the yoke 42, i.e. frame members 118, 120, 122, bearings 124, 126 and actuator 128 (FIG. 2). As explained briefly above, longitudinally extending frame member 122 is fixedly secured to the rear surface 121 of leg section 44 of yoke 42. One end 182 of frame member 122 is connected in bearing through spherical bearing 124 to laterally extending frame member 118. FIG. 5 shows that the housing portion 184 of bearing 124 is affixed to the top surface of frame member 118 by a bolt or the like. A spherical element 185 is positioned in housing 184 and is connected to frame member 122 by means of bearing arm or rod 188. The spherical element 185 is contained in a spherical cavity in the housing 184 while bearing arm 188 extends through a cylindrical opening in housing 184 connecting with the spherical cavity. This arrangement permits a slight lateral (back and forth) movement of the longitudinally extending frame member 122 while also permitting the frame member 122 to rotate slightly by virtue of spherical element 185 moving within the housing cavity.

A similar structural arrangement exists at the other end 190 of frame member 122. Bearing 126 includes a spherical element 193 capable of movement within a spherical cavity in a bearing housing 194, and a connecting arm 195. The housing 194 is connected to the upper surface 197 of horizontal frame member 120 through a longitudinal slide assembly shown generally at 196. A linear ball screw actuator 128 (FIG. 2) is connected directly between bearing housing 194 and the upper surface 197 of frame element 120, between the end of the slide assembly 196 and primary horizontal member 98. Actuation of the linear ball screw 128 moves end 190 of frame member 122 laterally, i.e. into and out of the page in FIG. 5 about spherical bearing 124 at the other end 182 of frame member 122. This arrangement provides approximately ±10 degrees of lateral or "yaw" movement for the second support frame 94 and hence the yoke 42 relative to fixture 10. Additional lateral movement could be readily provided by having a slide/linear ball screw arrangement on frame member 118 similar to the one on frame member 120.

Referring again to FIGS. 1-3, the movement of yoke 42 in the "roll" direction is accomplished by actuator 200. Actuator 200, which in the embodiment shown is another conventional linear ball screw actuator, is connected between the upper surface 201 of primary longitudinal member 96 and leg section 44 of yoke 42, through a pivoting connector 203. Actuation of the linear ball screw 200 results in a change in the "roll" position of the yoke 42 relative to the fixture 10 and hence the part therein.

The arrangement of the present invention thus provides convenient movement of the yoke 42 in several reference directions, including the longitudinal direction relative to the fixture, the vertical direction relative to the fixture, the yaw direction, i.e. about a vertical axis relative to the fixture, and the roll direction, i.e. about a horizontal longitudinal axis relative to the fixture. The present arrangement has the significant advantage of always maintaining the two actuator systems 54 and 56 in direct opposition, regardless of the position of yoke 42. It also permits the entire yoke assembly to be moved along a straight track while the yoke and hence, the actuator systems, change position in order to accommodate curved or differently oriented portions of the part. This degree of motion possible with the yoke 42 straddled over the fixture provides a convenient means of performing operations on a part while that part is clamped into a floor fixture.

Figure 6:
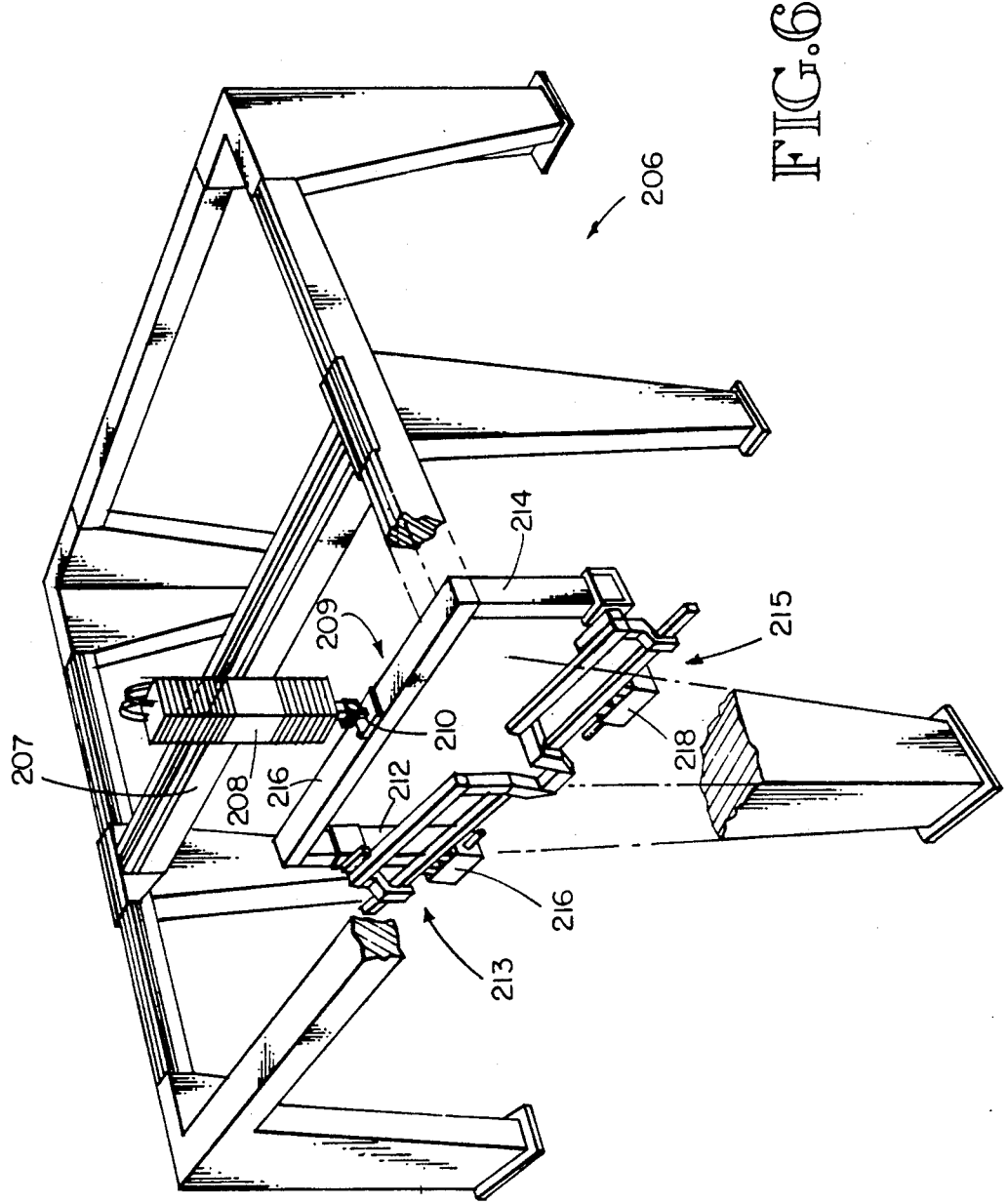
FIG. 6 shows a gantry support structure for the yoke assembly of the present invention.
Figure 7:
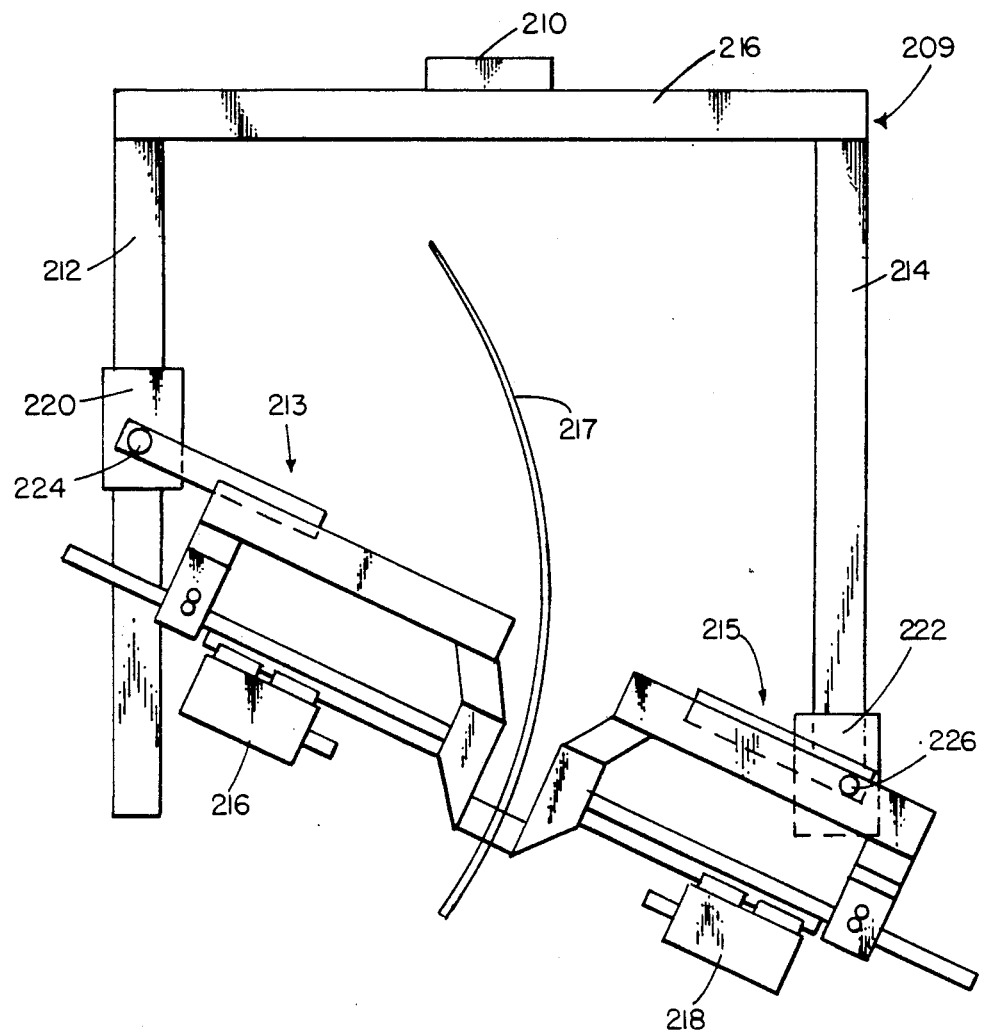
FIG. 7 shows a portion of the gantry supported system of FIG. 6.

FIGS. 6 and 7 show another embodiment of the present invention, in which the yoke assembly is supported from above the fixture by a gantry. The gantry support assembly is shown generally at 206, and comprises a system of fixed upright and horizontal support elements which in turn support a first gantry frame member 207 which is movable along the gantry support assembly longitudinally and hence along the fixture therebeneath. Depending from gantry frame member 207 is a gantry element 208, capable of moving in several different directions. A yoke 209 is connected to gantry element 208 by a connector 210. Yoke 209 comprises two vertical leg portions 212 and 214, connected by an intermediate portion 216. Mounted on leg portions 212 and 214 are two actuator systems 213 and 215. Actuator systems 213 and 215 support mechanical equipment such as opposed riveting systems 216 and 218, as well as other equipment, if desired, for use on a part to be assembled, such as wing panel 217 (FIG. 7). The actuator systems are positioned on slide assemblies 220,222 which are in turn mounted and controlled such that they are independently movable vertically along the respective leg portions 212 and 214. The actuator systems 213, 215 are also capable of rotating independently about mounting pins 224 and 226. Hence, the embodiment of FIGS. 6 and 7 is different than the embodiment of FIGS. 1-5, in that the actuator systems of FIGS. 6 and 7 are movable independently vertically and rotationally, as well as toward and away from each other. The gantry element 208 is also capable of moving the yoke 209 as a unit in both the roll direction and the yaw direction relative to the fixture. The system of FIGS. 6 and 7 is capable of conveniently following the curved surfaces of a part being assembled and of maintaining precise relative alignment between the actuator systems, although alignment of the actuator systems is somewhat more complicated due to the independent moving capability of the actuator systems relative to their respective leg portions.

In use of the embodiments of FIGS. 1-5 or FIGS. 6-7, the part to be manufactured is first firmly positioned in a fixture, such as fixture 10. The yoke assembly is then positioned about the fixture. For each operation, the yoke assembly is positioned at a desired location relative to the fixture and hence the part being assembled, relying on four types of movement, longitudinal movement, vertical movement, roll movement, and yaw movement. The actuator systems are then moved into correct position relative to each other and the desired mechanical operations are performed. For instance, in a riveting operation, a drill will first be moved into position and then a hole is drilled in the part. A rivet is then inserted into the hole, a riveting operation is then performed, and the remaining rivet head will be milled down flush with the surface of the part. Following that, the yoke and the actuator systems will be repositioned at the next desired point of operation on the part. This process continues until all of the desired operations have been performed on the one part in the fixture. The completed part is then removed and the next part put in place in the fixture.

The present invention is thus an automated yoke apparatus for the assembly or manufacture of parts, particularly large parts such as aircraft spars, which typically require a supporting fixture. The yoke is relatively easy to control and maneuver, and in one embodiment, the actuator systems containing the mechanical operation equipment are maintained in continuous opposing alignment, regardless of the position of the yoke relative to the fixture. The overall operation of the apparatus is thus simplified and the resulting structure is much less complicated and expensive than existing similar automated machines.

Although a preferred embodiment of the invention has been disclosed herein for illustration, it should be understood that various changes, modifications and substitutions may be incorporated in such embodiment without departing from the spirit of the invention which is defined by the claims which follow:

I claim:

1. A movable yoke assembly apparatus for performing automated mechanical operations on a part supported by a fixture having a top and two opposing sides extending downwardly therefrom, comprising:

a generally C-shaped continuous yoke, having two opposing leg portions and an intermediate portion, which extends over the top of the fixture and downwardly, facing the sides of the fixture;
means for supporting said yoke relative to the fixture;

a pair of actuator systems mounted on the opposing leg portions of said yoke for performing mechanical operations on the part;

means for moving said actuator systems toward and away from each other;

means for moving said yoke longitudinally relative to the fixture; and means for moving said yoke vertically relative to the fixture.

2. An apparatus of claim 1, wherein said actuator systems are mounted in continuous opposing alignment with each other such that they can only move toward and away from each other.

3. An apparatus of claim 2, wherein the yoke assembly is supported on the fixture.

4. An apparatus of claim 3, wherein the fixture includes a longitudinal slide assembly in the vicinity of a lower edge thereof, and wherein said yoke assembly includes means for mating with the slide assembly for moving said yoke therealong.

5. An apparatus of claim 1, wherein the yoke assembly is supported from above the fixture.

6. An apparatus of claim 1, wherein the yoke assembly is supported adjacent to, but separate from the fixture.

7. An apparatus of claim 1, including means for moving said yoke in a yaw direction relative to the fixture.

8. An apparatus of claim 1, including means for moving said yoke in a roll direction relative to the fixture.

9. An apparatus of claim 1, including means for controlling the movement of the actuator systems in a coordinated manner and for controlling the mechanical operations carried out on the part.

10. An apparatus of claim 9, wherein one mechanical operation is riveting.

11. An apparatus of claim 1, wherein the yoke assembly includes a first frame mounted to the fixture and further includes means for moving said first frame along the length of the fixture.

12. An apparatus of claim 11, wherein the yoke assembly includes a second frame having one portion thereof which is connected to said yoke and wherein the second frame includes means movably connecting the second frame to said first frame such that said second frame and hence said yoke move vertically relative to said first frame and the fixture.

13. An apparatus of claim 12, wherein said one portion of said second frame is movably connected to the remainder of said second frame so that said yoke is capable of moving in a yaw direction relative to the fixture and wherein said remainder of said second frame is further movably connected to said yoke in such a manner that said yoke is capable of moving in a roll direction relative to the fixture.

14. An apparatus of claim 1, wherein the yoke assembly is supported about one leg portion of said yoke, the other leg portion being cantilevered relative thereto.

15. An apparatus of claim 14, wherein one of the actuator systems is substantially heavier than the other, and wherein said one actuator system is mounted on said one leg portion.

16. A moveable yoke assembly apparatus for performing automated mechanical operations on a part supported by a vertically oriented fixture having a top and two opposing sides extending downwardly therefrom, comprising:

a generally C-shaped continuous yoke which extends over the top of the fixture, said yoke having two opposing leg portions and an intermediate portion;

means for supporting said yoke relative to the fixture, wherein said yoke support means includes means which extends over and above both the fixture and the yoke assembly for the length of the fixture, and further includes means movably mounting the yoke assembly from said supporting means;

a pair of actuator systems mounted on the opposing leg portions of said yoke;

means for moving said actuator systems toward and away from each other;

means for moving said actuator systems along the opposing leg portions of said yoke vertically relative to the fixture and the part; and means for moving said yoke longitudinally along the fixture.

17. An apparatus of claim 16, wherein the yoke assembly is supported on the fixture.

18. An apparatus of claim 16, wherein the yoke assembly is supported adjacent to, but separate from, the fixture.

19. A moveable yoke assembly apparatus for performing automated mechanical operations on a part which is supported by a vertically oriented fixture having a top and two opposing sides extending downwardly therefrom, comprising:

a generally C-shaped continuous yoke which extends over the top of the fixture and downwardly, facing the sides of the fixture, said yoke having two opposing leg portions and an intermediate portion;

means for supporting said yoke on the fixture;

a pair of actuator systems mounted on the opposing leg portions of said yoke;

means for moving said actuator systems along the opposing leg portions of said yoke vertically relative to the fixture and the part; and means for moving said yoke longitudinally along the fixture.

20. An apparatus of claim 16, wherein said mounting means includes means for moving said yoke in a yaw direction relative to the fixture and a roll direction relative to the fixture.

21. An apparatus of claim 16, including means for mounting said actuator systems on said leg portions such that said actuator systems can rotate in a vertical plane.

22. An apparatus of claim 19 wherein the actuator systems are moveable independently along the opposing leg portions and wherein the apparatus includes means for mounting the actuator systems on said leg portions such that said actuator systems can rotate in a vertical plane, and further includes means for controlling the movement of said actuator systems such that the actuator systems can be brought into direct opposition with each other, regardless of the relative vertical positions of the actuator systems, to perform mechanical operations such as riveting.

* * * * *